United States Patent [19]

De Lanauze

[11] 3,808,934

[45] May 7, 1974

[54] DIE SAWING MACHINE

[76] Inventor: Jacques De Lanauze, 6421 Goncourt Ave., Villa D'Anjou, Quebec, Canada

[22] Filed: Jan. 22, 1973

[21] Appl. No.: 325,835

[30] Foreign Application Priority Data
Dec. 11, 1972 Canada ............................. 158561

[52] U.S. Cl. .................... 83/747, 83/746, 14/144 R
[51] Int. Cl. ...................... B23d 49/08, B27b 19/02
[58] Field of Search ............. 83/747, 746, 753, 758, 83/761, 781, 425; 76/107 C; 144/144 R

[56] References Cited
UNITED STATES PATENTS
2,823,446   2/1958   Crane .................................. 83/747
3,280,682   10/1966  Sauer .................................. 83/347
3,570,351   3/1971   Spengler ............................. 83/425
1,799,215   4/1931   Colby .................................. 83/746
3,152,625   10/1964  Bohrer ................................ 83/746

Primary Examiner—Donald R. Schran
Attorney, Agent, or Firm—Cushman, Darby & Cushman

[57] ABSTRACT

A machine for sawing curved die boards includes a sawing fixture for supporting a curved die board and a saw mounted coaxially with the longitudinal axis of the curved die board and adapted to saw radial slots in the board from the inside thereof.

4 Claims, 6 Drawing Figures

DIE SAWING MACHINE

This application relates to sawing machines and in particular, to a saw for cutting curved die boards of the type used in the rotary die stamping art. Specifically the saw of the present invention is adapted to cut slots in the curved die boards with extreme accuracy and precision.

In the art of die stamping, curved die boards are provided with slots in their surface into which cutting rules are fitted in a predetermined and layed out pattern. At present, there are several means of cutting the slots in the curved die boards but for numerous reasons, the known methods and apparatus for cutting these slots are unsatisfactory. One example of the state of the art is the arrangements wherein a sabre type of saw has a work platen on its lower end which has a surface that is curved to fit the curved surface of the die board. The latter is secured to a frame like member and the saw is then placed on the surface of the board and the pattern layed out on the board is cut by the saw. The main disadvantage of this type of arrangement is that the lower end of the saw blade is free and when the saw is cutting pattern lines that have some curvature, there is a tendency for the saw blade to go off centre somewhat with respect to the projected radial centre line of the slot. In other words, the blade is not precisely radially aligned with the projected central longitudinal axis of the curved wood. Accordingly, there is a twisting effect placed upon the cutting rules that are subsequently placed in the die board slots.

Another example of the art is found in U.S. Pat. No. 3,570,351 — Spengler of Mar. 15, 1971, in which a saw for machining a curved surface is of the well known jig saw type of lay out, but the work piece support is curved and is both rotatable and also tiltable so that the curved die board placed on the work surface can be moved under the reciprocating saw blade. The disadvantages of this device are that it is always more preferable to have the saw in movement rather than the wood; there are an extremely large number of reciprocating parts and the overall saw layout is large, cumbersome and expensive to manufacture.

The object of the present invention is to correct the deficiencies in known devices such as those mentioned above in providing a machine for sawing curved die boards to obtain an extremely high accuracy and precision in the cutting of the die board slots. The saw of the present invention is compact, easy to use and relatively inexpensive. The saw is adapted for use with a new type of sawing fixture, also to be described in this application, and according to one aspect, the machine for sawing curved die boards consists of a collar member that is adapted for mounting on a central shaft of a sawing fixture and coaxial with the projected, central longitudinal axis of a curved die board. A reciprocating type saw is positioned on the collar and is moveable in a radial direction to an outer or operative position and to an inner or inoperative position and an orbital guide is connected to the collar member for moving the collar and the saw in an orbital path relative to the curved die board. The orbital guide is positioned radially outwardly of the die board and a radial saw blade guide is mounted on the orbital guide for receiving and guiding the blade when the saw is in its operative position.

The invention will be described by way of example with reference to the accompanying drawings wherein.

Figure 1:
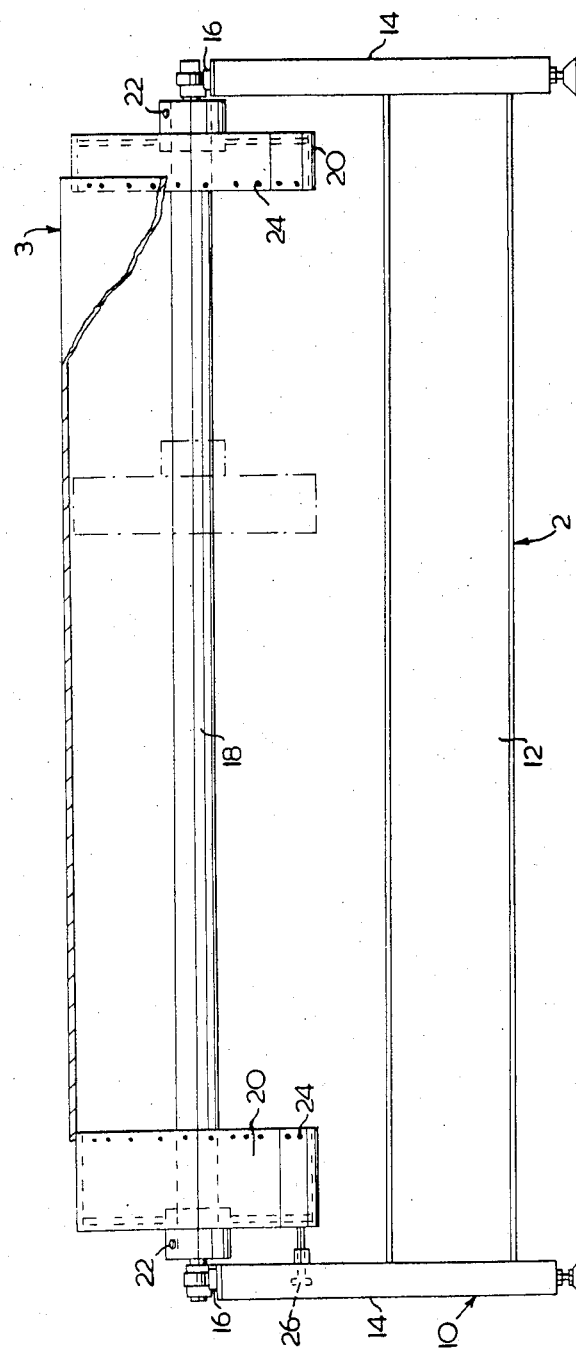
FIG. 1 is an elevation view of the sawing fixture.
Figure 2:
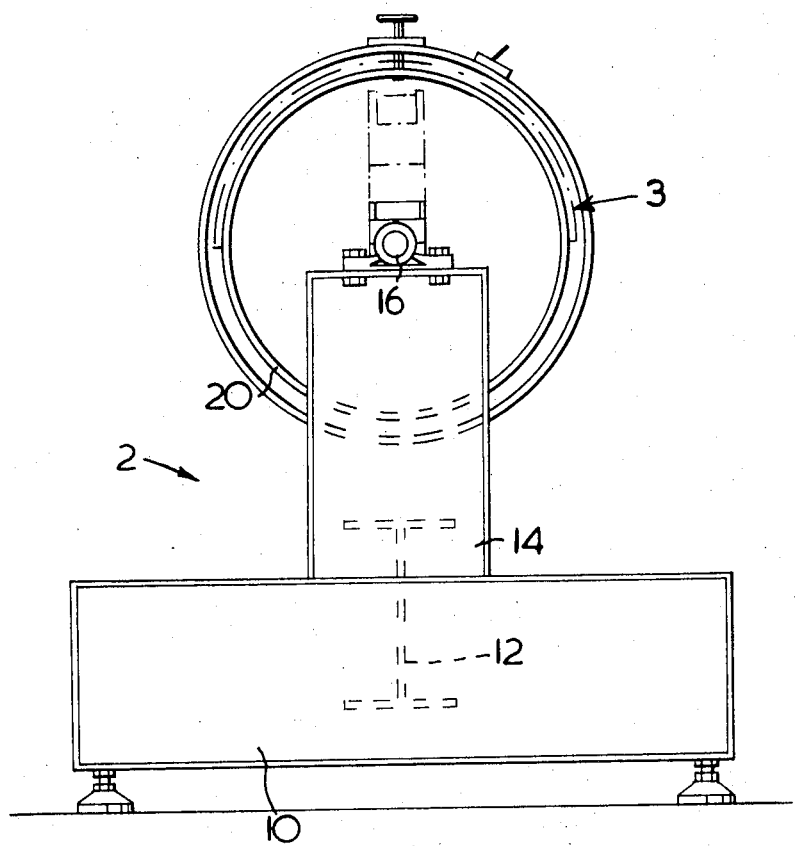
FIG. 2 is an end view of the sawing fixture shown in FIG. 1 and illustrating the relative positions of the saw and orbital guide.

Referring to FIGS. 1 and 2 and particularly the latter, the invention includes a sawing fixture 2 which mounts a half-round section of curved die board 3 and a saw 4 shown in phantom line in FIG. 2 for cutting slots in the wood.

As illustrated in FIG. 1, the sawing fixture 2 consists of a frame made up of a pair of end plates 10 interconnected by a suitable length of I beam 12. The end plate 10 further support upright end pieces 14. On the upper surface of each end plate 14, a pair of pillow blocks serve to rotatably support the ends of a shaft 18 which in turn is provided, adjacent each of its ends, with a circumferential end mount 20, releasably secured to the shaft by a clamping sleeve 22. It will be seen from FIG. 1 the mount 20 on the right hand side of the drawing, is adapted to be moveable along the shaft 18 to accommodate curved die boards of varying lengths. It will be further noted that each end mount 20 is provided with a plurality of spaced apertures 24 by means of which the die board is releasably secured such as by screws to the mounts 20. It will also be noted from FIG. 1 that one end of the frame 10 is provided with a plunger type locking device 26 adapted to engage an aperture in one of the mounts 20 to prevent rotation of the two mounts interconnected by the curved die board.

Although the board 3, in end view, covers one half of a circle, the shaft 18 is coaxial with the projected longitudinal axis of the board 3 if in fact it were in full circle.

Figure 3:
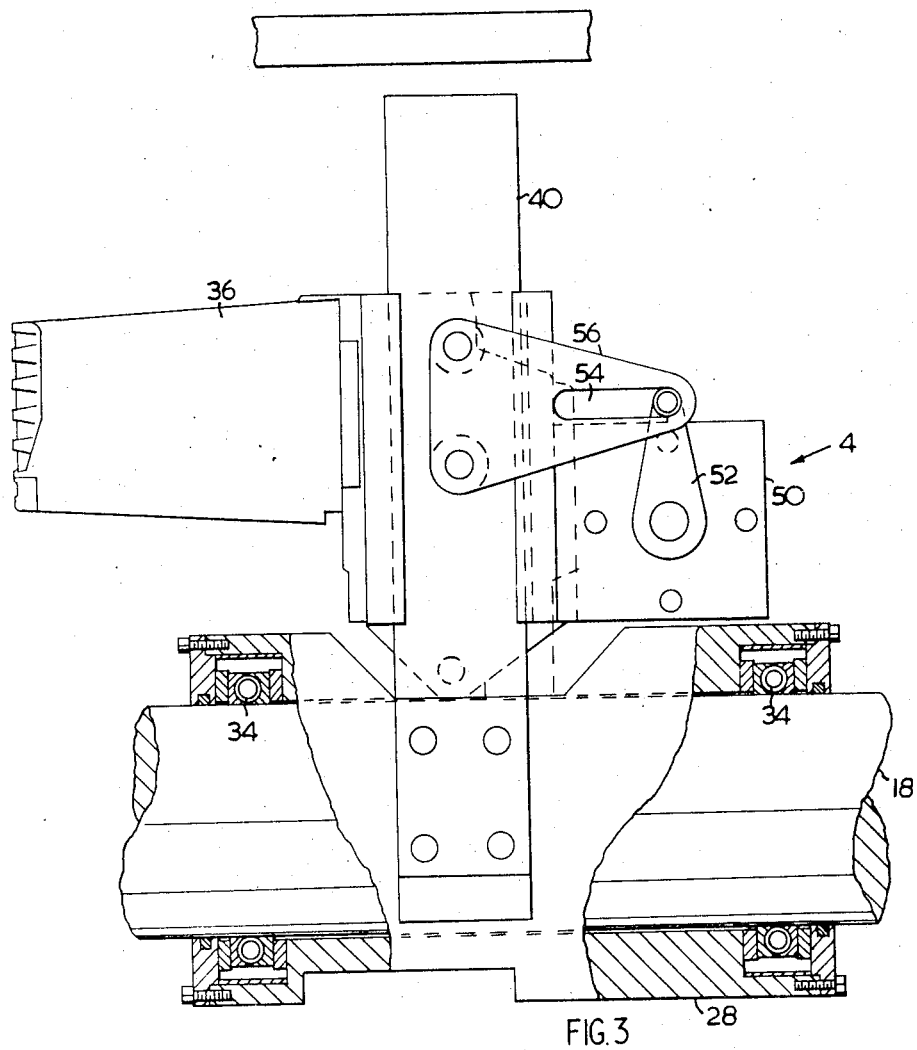
FIG. 3 is an elevation view, partly in section, of the saw in its lower or inoperative position.
Figure 4:
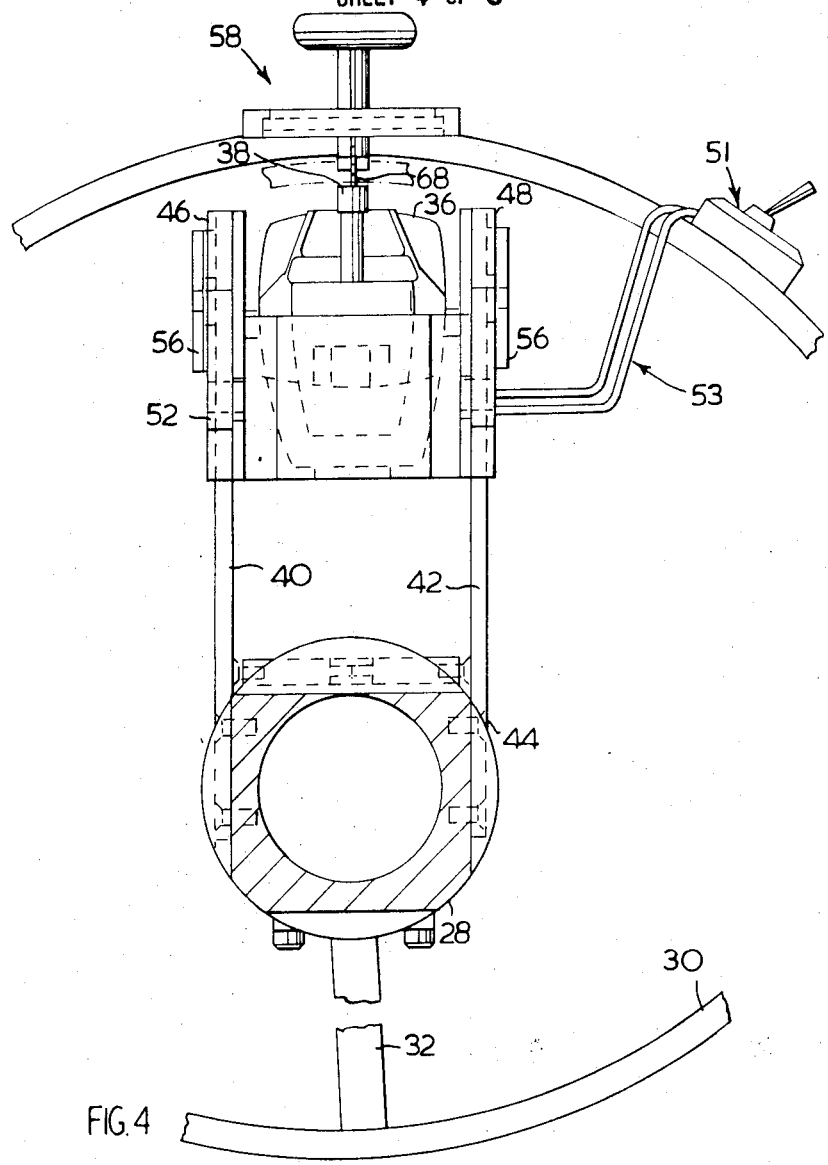
FIG. 4 is an end view of the orbital guide with the saw mechanism mounted thereon and showing the saw in its upper or operative position with the blade operative between the saw spindle and the blade guide.

Turning now to FIGS. 3 and 4, the saw 4 is mounted on a sleeve 28 which is coaxial with a planetary orbital guide 30, the sleeve 28 and orbital guide 30 being interconnected by an arm 32 as shown in FIG. 4. Sleeve 28, as shown in FIG. 3, is mounted for a free rotation on the shaft 18 of the sawing fixture by means of suitable bearings 34.

The saw may consist of the known sabre saw variety of device which includes a motor housing 36 having a rotatable blade spindle 38.

The body 36 of the saw is moveable between a lower inoperative position, as shown in FIG. 3, to a raised or operative position, as shown in FIG. 4 whereby, in the lower, inoperative position the orbital guide can be moved under the curved die board to the desired position for slot sawing.

A pair of parallel, upright guides 40 and 42 are secured as at 44 to the collar 28. The saw body 36 is provided on each of its sides with a pair of rail members 46 and 48 which in effect mount the saw body on the guides 40 and 42 for movement between the inoperative and operative positions. It will be noted also from FIG. 3 that the saw is provided with a fluid operated motor 50, for example an hydraulic or pneumatic rotary actuator, which is provided on each of its sides with a bell crank 52. The terminal ends of the bell crank 52 slidably engage longitudinal slots 54 in arms 56 secured to and extending normally from the guides 40 and 42.

In the present example of the invention, the rotary actuator 50 is pneumatically operated from a compressor (not shown) the directional operation of the actuator 50 between the operative and inoperative positions is governed by a directional controller 51 which is mounted on the guide 30 and is connected in the lines from the compressor to the actuator 50. As shown, pneumatic lines 53 extend between the controller 51 and actuator 50.

It will be appreciated from a study of FIGS. 3 and 4 that when the rotary actuator 50 is operated, the terminal ends of the bell cranks 52 are held to horizontal sliding movement as shown in FIG. 3 along the slots 54 so that the effect is to cause a raising of the actuator 50 itself and the saw body 36 secured thereto. Conversely, when the actuator is operated in the other direction, the bell cranks 52 cause a lowering of the saw to the FIG. 3 position.

Figure 5:
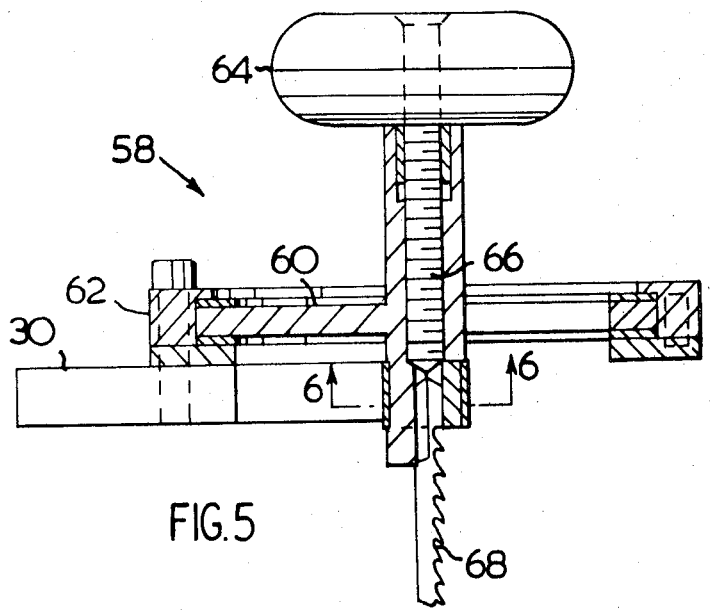
FIG. 5 is a more detailed view of the saw blade guide shown in FIG. 4.
Figure 6:
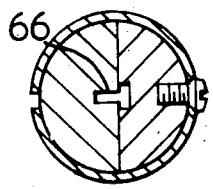
FIG. 6 is a sectional view of the blade guide, taken along the line 6—6 of FIG. 5.

As shown in FIG. 4, the orbital guide 30 serves to mount a radial saw blade guide indicated generally at 58. The guide 58 is shown in detail in FIGS. 5 and 6 and it will be noted therefrom that the guide includes a partial disc 60 secured for free rotational movement in a holder 62 that is securely mounted to the outer surface of the orbital guide 30. The disc 60 is integrally formed with a rotatable handle member 64 which is provided with an elongated socket 66, the lower end of which is adapted to receive the terminal end of the saw blade 68 when the saw is in its operative position, as shown in FIG. 4. It will be seen in FIG. 6 that the socket 66 is machined to accept the particular cross-section of the blade being used, in this case a T-shape.

It will be noted from FIG. 4 that the socket 66 and in fact the complete handle shaft of the guide 58 is in perfect radial alignment with the saw blade spindle 38 of the saw mounted on the sleeve 18. It will be further acknowledged that through the interconnection of the collar 28 on the shaft 18 and the orbital guide 30 by means of the arm 32, rotation of the guide 30 affects the rotation of the saw and its accessories.

In operation, the clearances between the spindle 38 of the saw, when the saw is in its upper, operative position, and the lower end of the guide 58, is such that there is probably around ⅛ of an inch clearance above and below the surface of the curved die board, shown for example in phantom line in FIG. 4. In this manner, there is little or no room for twisting of the blade in its short, guided travel.

To carry out a sawing operation, the saw is lowered to its FIG. 3 or its inoperative position by the controller 51 and the curved die board is placed between the orbital guide 30 and the saw itself and it secured to the circumferential mounts 20 as previously described. It will be appreciated that the pattern for slot cutting has already been applied to the surface of the die board 3 and suitable fine holes are drilled at the desired start locations for the sawing operation. The orbital guide 30 is then moved until a selected drilled hole is immediately beneath the socket of the radial guide 58 and the rotary actuator 59 is operated to raise the saw 36 bringing the blade upwardly through the aperture and into the socket 66.

The guide 58 controls complete rotation of the blade 68 and by rotating the handle 64, the disc 60 and socket 66 can be turned in any direction. Accordingly, the operator begins to follow the pattern line in any direction and when any one pattern line terminates, he then operates the rotary actuator to lower this saw to its inoperative position, thereafter moving the unit by means of the orbital guide 30 to the next hole where the operation is repeated. By virtue of the fact that the saw blade 68 is in effect in full radial alignment with respect to the shaft 18 and the projected longitudinal axis of the board 3 a true and accurate radial path is cut for the slots.

We claim,

1. A machine for sawing curved die boards comprising a collar member adapted for mounting on a central shaft of a sawing fixture and coaxial with a projected, central longitudinal axis of a curved die board; a reciprocating type saw positioned on the collar and being moveable in a radial direction to an outer, operative position and an inner, inoperative position; an orbital guide connected to said collar member for moving the collar and saw in an orbital path relative to the curved die board, the orbital guide being positioned radially outwardly of the die board; and a radial saw blade guide mounted on the orbital guide for receiving and guiding the blade when the saw is in its operative position and for directing the blade in any direction in accordance with a die board pattern.

2. A device for sawing slots in curved die board, comprising a sawing fixture, including a frame having a base and end sections extending upwardly from that base; a central shaft rotatably mounted on and extending between said end sections; circumferential mounts moveably positioned on the shaft and being adapted to have a curved die board removeably secured thereto; a sawing machine comprising a collar member mounted on said shaft for rotational and longitudinal movement thereon an orbital guide member situated beyond the outer surface of said curved die board and interconnected with the collar on the shaft; a reciprocating type saw secured to the collar and being moveable in a radial direction with respect to the collar to an outer operative position and an inner inoperative position; said saw being moveable in an orbital path relative to the inside of the curved die board through movement of said outer orbital guide; and a saw blade guide mounted on the orbital guide for receiving and guiding the blade of the saw when the latter is in its operative position and for directing the blade in any direction in accordance with a pattern on the die board.

3. A machine according to claim 1 including a pair of saw guide members secured to and extending from said collar, said saw having a pair of rail members, one on each side thereof, adapted to engage said guide and to slide therealong between its inner, inoperative position and its outer, operative position.

4. A saw according to claim 3 including means for moving said saw between its inoperative and operative positions comprising an actuator attached to said saw body and means interconnecting the actuator with said saw guides whereby operation of the actuator affects a movement of the saw relative to the guides.

* * * * *